UNITED STATES PATENT OFFICE

LEVIS MILLER BOOTH, OF PLAINFIELD, NEW JERSEY

PROCESS OF MANUFACTURING PAPER AND PAPER BOARD

No Drawing. Application filed October 5, 1928. Serial No. 310,675.

This invention relates to a process of manufacturing paper and paper board and the objects of my invention are to arrest decomposition and also to cause the precipitation as solids of the water soluble decomposition products whereby these may be retained in the paper or paper board produced.

In the manufacture of some grades of paper and board it is customary to use old papers or old rags in the furnish. Due to the inherent characteristics of these materials, the methods of collection, and the conditions of storage, decomposition occurs and a deterioration of the cellulose fiber content results. When such materials are furnished to the beaters care is taken to keep out only what might be termed gross impurities, so that the furnish comprises an appreciable percentage of organic matter other than clean paper making fibers. Where new fibers are employed decomposition is also prevalent in closed systems.

Frequently in the manufacture of these products hot water is used in the beaters or steam is applied for the purpose of heating the stock. Heat promotes decomposition.

Under the conditions prevailing it is obvious that part of the raw material is lost in the process. This is evidenced in part by the characteristic odor of decomposition which prevails and also by the shrinkage which results when no attempt is made to prevent decomposition or to retain the products of decomposition.

While some of the products of decomposition which occur in paper making systems are malodorous, carbon dioxide and other substances which have no odor are also formed.

I have found that it is possible to effect a material reduction in the shrinkage in such paper or board making process by the addition of chemical reagents which arrest decomposition and which cause the precipitation of carbon dioxide in combination as a solid. By my process the precipitated solid is retained as a filler in the finished sheet of paper or paper board instead of being lost.

In carrying out my process I may employ commercial chlorinated lime which contains approximately 35% of available chlorine, I may use low test commercial chlorinated lime which contains 25% to 30% available chlorine, or I may use oxide of lime or hydrated lime in connection with chlorine. I apply the chlorine or chlorine product and alkali either separately or together in the beaters or at some other convenient point in the system. The chlorine or the chlorine part of the chlorinated alkali serve in part to arrest bacterial action and consequent decomposition, and the hydrated lime and the lime portion of the chlorinated lime also arrest decomposition and effect a precipitation of the carbon dioxide which has resulted from decomposition of cellulose. I have found that the desired results of eliminating slime and reducing shrinkage may be accomplished by the use of 2 lbs. to 5 lbs. of chlorinated lime per ton of paper or board made or the approximate equivalent of the active components, namely, oxide or hydrated lime and chlorine. In this latter instance the chlorine may be obtained from the electrolytic decomposition of salt solution or compressed liquid chlorine or chlorine from any other source may be used. I may substitute for calcium hypochlorite other hypochlorites, such as sodium hypochlorite or other substance in combination with chlorine, and in place of calcium oxide or calcium hydroxide, I may use any other suitable metallic oxide or hydroxide.

Besides the use of the components of chlorinated lime in amounts as specified above, I have found it desirable to use hydrated lime in amounts varying from 1.0 to 3.0 lbs. per ton of paper or board made. In one instance I have used 45 lbs. of chlorine and 240 lbs. of hydrated lime in the manufacture of 60 tons of paper board.

I employ this improved process either without coagulating chemicals or with aluminum or iron bearing coagulants or a combined coagulant as described in my United States Patent No. 1,443,454 granted Jan. 30, 1923. The coagulant may be applied at any convenient place, for example, to the stock as delivered to the paper machine or to the white water from the paper machine before the white water is recirculated.

In my use of chlorine and oxide or hydrated lime or other alkali and chlorinated lime I do not follow the customary methods in which chlorinated products are employed in bleaching, wherein the mineral residue of alkali base is removed and disposed of before the bleach solution is used, and I do not wash out any of the chemicals applied, but incorporate these added chemicals in the finished paper or board.

Claims:

1. The process of manufacturing paper and paper board which consists of adding a chlorinated substance to the stock and retaining the mineral residue in the product.

2. The process of manufacturing paper and paper board which consists of adding a chlorinated substance and a hydrated alkali to the stock and retaining the mineral residue in the product.

3. The process of manufacturing paper and paper board which consists of adding chlorinated alkali and oxide of lime to the stock and retaining the mineral residue in the product.

4. The process of manufacturing paper and paper board which consists of adding hydrated lime and chlorine to the stock and retaining the mineral residue in the product.

5. The process of manufacturing paper and paper board which consists of adding lime oxide and chlorine to the stock and retaining the mineral residue in the product.

6. The process of manufacturing paper and paper board which consists of adding chlorinated lime and a separate coagulating material to the stock and retaining the mineral residue in the product.

7. The process of manufacturing paper and paper board which consists of adding a hydrated alkali and chlorine and a separate coagulating material to the stock and retaining the mineral residue in the product.

8. The process of manufacturing paper and paper board which consists of adding oxide of lime, chlorinated lime and a separate coagulating material to the stock and retaining the mineral residue in the product.

9. The process of manufacturing paper and paper board which consists of adding a hydrated alkali, chlorinated lime and a separate coagulating material to the stock and retaining the mineral residue in the product.

10. The process of manufacturing paper and paper board which consists of adding lime oxide, chlorine and a separate coagulating material to the stock and retaining the mineral residue in the product.

LEVIS MILLER BOOTH.